(12) United States Patent
Kuntz et al.

(10) Patent No.: US 7,033,653 B2
(45) Date of Patent: Apr. 25, 2006

(54) BIREFRINGENT MARKING

(75) Inventors: Matthias Kuntz, Seeheim-Jugenheim (DE); Robert Hammond-Smith, Fordingbridge (GB); Rodney Riddle, Dorset (GB); John Patrick, Dorset (GB); Donald Graham, Dorst (GB)

(73) Assignee: Merck Patent GmbH, Darmstadt (DE)

( * ) Notice: Subject to any disclaimer, the term of this patent is extended or adjusted under 35 U.S.C. 154(b) by 60 days.

(21) Appl. No.: 10/475,715

(22) PCT Filed: Mar. 28, 2002

(86) PCT No.: PCT/EP02/03502

§ 371 (c)(1),
(2), (4) Date: Oct. 23, 2003

(87) PCT Pub. No.: WO02/085642

PCT Pub. Date: Oct. 31, 2002

(65) Prior Publication Data

US 2004/0124398 A1    Jul. 1, 2004

(30) Foreign Application Priority Data

Apr. 24, 2001   (EP) .................................. 01109447

(51) Int. Cl.
  *C09K 19/52*  (2006.01)
  *G02F 1/13363* (2006.01)
(52) U.S. Cl. ...................... 428/1.1; 349/117; 349/171; 349/175; 349/181; 252/299.01
(58) Field of Classification Search ............... 427/210, 427/207.1, 163.1, 256, 258, 283, 402; 252/299.01; 428/1.1, 1.3; 349/171, 175, 181, 117
See application file for complete search history.

(56) References Cited

U.S. PATENT DOCUMENTS

| 4,514,085 | A | * | 4/1985 | Kaye ........................... 356/71 |
| 5,670,083 | A | * | 9/1997 | Akashi et al. ......... 252/299.01 |
| 6,144,428 | A |   | 11/2000 | Schadt et al. |
| 6,496,287 | B1 | * | 12/2002 | Seiberle et al. ................ 359/15 |
| 6,628,439 | B1 | * | 9/2003 | Shiozawa et al. ............... 359/2 |
| 6,734,936 | B1 | * | 5/2004 | Schadt et al. ................ 349/117 |
| 6,829,075 | B1 | * | 12/2004 | Kosc et al. .................. 359/272 |
| 6,924,861 | B1 | * | 8/2005 | Hammond-Smith et al. ........................ 349/129 |
| 2003/0178609 | A1 | * | 9/2003 | Hammond-Smith et al. ......................... 252/587 |

FOREIGN PATENT DOCUMENTS

| EP | 0435029 |   | 7/1999 |
| EP | 1028359 |   | 2/2000 |
| EP | 1 028 359 | * | 8/2000 |
| GB | 2328180 |   | 2/1999 |

* cited by examiner

*Primary Examiner*—Shean C. Wu
(74) *Attorney, Agent, or Firm*—Millen, White, Zelano, Branigan, P.C.

(57) ABSTRACT

The invention relates to a birefringent marking comprising a liquid crystal material. The invention further relates to method of providing such a birefringent marking and to the use of the birefringent marking for decorative or security applications.

16 Claims, No Drawings

BIREFRINGENT MARKING

FIELD OF THE INVENTION

The invention relates to a birefringent marking comprising a liquid crystal material. The invention further relates to method of providing such a birefringent marking and to the use of the birefringent marking for decorative or security applications.

BACKGROUND AND PRIOR ART

The use of birefringent films as security devices has been reported in prior art. GB 2328180 discloses a security device comprising a birefringent film having regions of different thickness, such that when the material is viewed through a polariser, a pattern is exhibited. The birefringent film is e.g. a stretched polymer film like a PET film. The pattern is achieved e.g. by forming recesses in the birefringent film, or by bonding the film to a higher melting point layer as supporting layer and reducing the thickness or destroying the birefringence in selected regions of the birefringent film. Destruction of the birefringence is achieved e.g. by melting, hot stamping, thermal printing or laser writing. Reduction of the film thickness is achieved e.g. by removing parts of the film or by laser writing. The higher melting point supporting layer then holds the partially destructed birefringent film in place. GB 2328180 further reports that a reflective layer can be applied to the birefringent film after provision of the pattern, e.g. by metallisation or printing of a reflective material.

The device according to GB 2328180 has several drawbacks. For example, its manufacture is complicated and require a series of manufacturing and processing steps like forming the pattern on the birefringent film, lamination to a high melting point supporting layer and application of the reflective layer. The methods of forming the pattern are also complicated and require additional technical effort and equipment, like the use of high temperatures or lasers. Furthermore, stretched plastic films used as birefringent layers as described in GB 2328180 do generally exhibit only moderate birefringence. Therefore usually a high film thickness is required to achieve a satisfying optical effect. The film thickness is further increased by the use of the supporting layer. Thus, GB 2328180 reports devices with a combined film thickness of the birefringent and supporting layer of about 15 µm. Such a high thickness is critical especially for applications in the security sector, like e.g. security markings to be applied on documents of value or banknotes.

The aim of the present invention is to provide a birefringent marking, in particular for decorative and security applications, that does not have the drawbacks of the prior art devices, is easy to manufacture and can be applied to a broad variety of substrates, surfaces and objects.

The inventors of the present invention have found that the above aims can be fulfilled by providing a birefringent marking comprising a liquid crystal (LC) material having discrete regions with different thickness. When this birefringent marking is viewed through a polariser, an image is seen that appears to rotate when the polariser is rotated. In particular striking visible effects can be achieved by providing the birefringent marking onto a reflective layer, like for example a metal layer, and/or by providing an optical phase shift or retardation layer between the birefringent liquid crystal layer and the reflective layer. The LC material can easily be provided e.g. directly onto a reflective substrate, thus a security marking can be prepared in an easy way, without the need of complicated methods or techniques and expensive equipment.

SUMMARY OF THE INVENTION

One object of the invention is a birefringent marking comprising at least one layer of liquid crystal material having regions of different thickness.

Another object of the invention is a method of preparing a birefringent marking as described above and below by applying droplets of a solution of a liquid crystal material to a substrate and allowing the solvent to evaporate.

Another object of the invention is a method of applying a hidden image to a surface or substrate, said image being invisible when viewed under unpolarised light and visible when viewed under polarised light, by providing a birefringent marking comprising a liquid crystal material having regions of different thickness to the surface.

Another object of the invention is the use of a birefringent marking as described above and below in optical elements, coatings, lacquers, inks or paints for cosmetic, decorative or security applications.

Another object of the invention is a security marking or device comprising a birefringent marking as described above and below.

DEFINITION OF TERMS

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

DETAILED DESCRIPTION OF THE INVENTION

The present invention relates to a method of incorporating a variable birefringent layer to a reflective section of a document, for example a banknote, such that a non regular pattern is seen when viewed through a linear polariser. The birefringent marking and its method of preparation according to the present invention have several advantages over prior art, such as

- the variation of the birefringent layer thickness can be formed without any processing such as laser etching
- the birefringent material can be applied to any non-porous reflective surface without prebonding to other materials,
- the birefringent material can be applied by conventional printing or coating techniques,
- the birefringent material exhibits a multicoloured pattern when viewed through a linear polariser,
- the coloured pattern appears to rotate when the polariser is rotated.

Preferred embodiments of the invention relate to a birefringent marking wherein the liquid crystal material is a vitrified, polymerised or crosslinked liquid crystal material, the liquid crystal material is a nematic or smectic liquid crystal material, the liquid crystal material is a cholesteric liquid crystal material, the birefringent marking further comprises a reflective layer between the liquid crystal layer and the substrate, and/or the substrate is a reflective substrate, the reflective layer or substrate is a metallic or metallized layer, hot stamping foil, holographic image, pearlescent or interference layer or pearlescent or interference pigment, the reflective layer comprises one or more interference pigments, preferably provided in a light transmissive binder, the reflective layer in addition to the interference pigments additionally comprises one or more further pigments or dyes, the birefringent marking further comprises an absorptive layer between the liquid crystal layer and the substrate, and/or the substrate is an absorptive layer, the birefringent marking further comprises at least one optical retardation layer on the side facing away from the substrate, said optical retardation layer is a quarter wave retardation layer, said optical retardation layer is a stretched or compressed film of isotropic polymer, the birefringent marking further comprises a linear polariser on the side facing away from the substrate, said linear polariser and/or optical retardation layer comprise a vitrifed, polymerised or crosslinked liquid crystal material with uniform orientation.

According to a preferred method of the present invention the birefringent marking is prepared by applying droplets of a mixture comprising a liquid crystal (LC) material and a solvent to a substrate or the surface of an object and allowing the solvent to evaporate.

The droplets preferably contain a mixture of the LC material and an organic solvent. The LC mixture can be a solution, dispersion or emulsion of the LC material in the solvent. Preferably a solution is used. Evaporation of the solvent from the applied LC droplets creates different thickness in the final LC layer, thus providing a non-uniform feature which is very difficult to copy. In this way, it is possible to prepare multiple security markings from one sample of LC material by the same method, wherein each marking has a unique pattern, like a fingerprint, which can be easily identified and is difficult to forge.

The LC mixture can be apppplied in fomr of droplets to the substrate by known techniques. In some cases it is suitable to heat the LC mixture in order to facilitate the evaporation of the solvent. The LC mixture can also be applied by other methods that are known in the art, like for example ink-jet, offset gravure and screen printing.

It is also possible to apply the LC mixture onto the substrate by means of a stamp.

The thickness of the LC layer can be altered for example by changing the solvent concentration of the LC mixture. The thickness of the final LC layer thus increases with increasing amount of LC material in the mixture. Another factor influencing the thickness of the LC layer is the way in which the applied droplets disperse on the substrate, which is related to the surface energy of the substrate and the surface tension of the LC droplets. These parameters can be changed by varying the substrate material or by varying the solvent and/or liquid crystal material. It is possible e.g. to alter the surface energy of the substrate by applying a layer of a for example a surface active material or an alignment material to the substrate. Alternatively e.g. a wetting agent or a surfactant can be added to the liquid crystal solution to change the surface tension of the LC droplets and their adhesion to the substrate. Suitable surfactants are described for example in J. Cognard, Mol. Cryst. Liq. Cryst. 78, Supplement 1, 1–77 (1981). Particularly preferred are nonionic surfactants, such as the commercially available fluorocarbon surfactants Fluorad 171 (from 3M Co.), or Zonyl FSN (from DuPont).

The birefringent marking is preferably applied onto a reflective surface or substrate. In a preferred embodiment, the birefringent marking already comprises the reflective layer on the side of the liquid crystal layer facing away from the viewer. The birefringent marking is then applicable to any kind of reflective non-reflective surface or substrate.

For the reflective substrate or layer in principle any reflective material can be used. Thus, the reflective layer is e.g. a metal or metallised layer, hologram, kinegram, hot stamping foil, pearlescent or interference pigment, or a layer comprising metal, metallised, pearlescent or interference pigments in a transparent binder.

Metal or metallised films or layers can be selected e.g of Al, Cu, Ni, Ag, Cr or alloys like e.g. Pt—Rh or Ni—Cr, or layers comprising one or more metal flakes dispersed in a light transmissive binder. Suitable metal flakes are e.g. flakes aluminium, gold or titan, or metal oxide flakes of e.g. $Fe_2O_3$ and/or $TiO_2$. Suitable pearlescent or interference pigments are e.g. mica, $SiO_2$, $Al_2O_3$, $TiO_2$ or glass flakes that are coated with one or more layers of e.g. titanium dioxide, iron oxide, titanium iron oxide or chrome oxide or combinations thereof, flakes comprising combinations of metal and metal oxide, metal flakes of e.g. aluminium coated with layers of iron oxide layers and/or silicium dioxide. It is also possible to use liquid crystal pigments or coatings comprising a polymerized or crosslinked liquid crystal material, e.g. cholesteric liquid crystal pigments as described in U.S. Pat. No. 5,364,557, U.S. Pat. No. 5,834,072, EP 0 601 483, WO 94/22976, WO 97/27251, WO 97/27252, WO 97/30136 or WO 99/02340.

It is also possible to use a reflective substrate or layer comprising a hologram or kinegram, a holographic layer with an embossed, patterned or structured surface, or a layer of reflective holographic pigments. Light reflected by higher regions of the structured surface will interfer with light reflected by lower regions of the structured surface, thereby forming a holographic image.

Thus, for example a substrate like e.g. a banknote, or selected regions thereof, can be printed or coated with a hologram or reflective metal layer, which is then covered by a birefringent marking as described above. This embodiment is particularly suitable for use as false-proof security threads or holograms on banknotes or documents of value, providing a security marking by which the banknote is easy to authenticate when viewed through a polariser.

In an alternative embodiment of the present invention the birefringent marking is applied to a transparent substrate and viewed in transmission between two polarisers.

Another preferred embodiment of the present invention relates to a birefringent marking wherein an optical phase shift or retardation layer is provided between the birefringent LC layer and the reflective substrate. The retardation layer causes an additional phase shift of the light reflected by the reflective substrate. This leads to an additional colour shift of the birefringent marking when viewed through a polariser. Preferably, the retardation layer is a quarter wave film or foil (QWF) exhibiting a net retardation that is approximately 0.25 times the wavelength transmitted by the circular polarising layer.

As a retardation layer, it is possible to use uniaxially or biaxially stretched or compressed films of an isotropic polymer, like e.g. polyethylene terephthalate (PET), polyvinyl alcohol (PVA), polycarbonate (PC), di- or triacetyl cellulose (DAC, TAC). For example PET films are commercially available from ICI Corp. under the trade name Melinex. Especially preferred are PVA and PET films.

It is also possible to use a phase shift layer or retardation film comprising vitrified, polymerised or crosslinked liquid crystalline material with planar orientation, i.e. with the mesogenic groups of the liquid crystal material being oriented substantially parallel to the plane of the layer into a preferred direction. A retardation film comprising polymerised LC material with planar orientation is described in WO 98/04651, the entire disclosure of which is incorporated into this application by way of reference. It is also possible to use an optical retardation film comprising one or more layers of a polymerised liquid crystalline material with tilted orientation, i.e. with the mesogenic groups of the liquid crystal material are oriented at an oblique angle relative to the plane of the layer into a preferred direction. Such a QWF is described in WO 98/12584, the entire disclosure of which is incorporated into this application by way of reference.

The retardation layer can also comprise platelet shaped microflakes of a light retarding material as mentioned above. Thus, e.g. a retardation film of a stretched polymer or polymerised LC material can be ground into small flakes which are then incorporated into a light transmissive binder system, and coated onto the reflective layer, to form the retardation layer.

In case the reflective substrate is a holographic layer as described above, the use of an additional phase shift or retardation layer leads to an to improved colour play and to an improved visibility of the holographic image, which is otherwise often difficult to recognize especially in a bright environment.

The birefringent marking according to the present invention contains a pattern or image that is invisible when viewed under unpolarised light and becomes visible only when viewed through a polariser. In a preferred embodiment, the birefringent marking already comprises a linear polariser on top of the liquid crystal layer, i.e. on the side facing away from the reflective substrate. The birefringent marking is then directly visible to the eye, without the use of a separate polariser. Such permanently visible birefringent markings are desired for specific applications.

For the linear polariser in principle all materials known in the art are suitable. Thus, e.g. standard linear absorption polarisers can be used comprising an uniaxially stretched polymer film of e.g. polyvinyl alcohol, or comprising a polymer film into which is incorporated a dichroic dye. It is also possible to use a linear polariser comprising a vitrified, polymerised or crosslinked liquid crystal (LC) material that exhibits macroscopically uniform planar orientation, i.e. with the mesogenic groups of the LC material being oriented substantially parallel to the plane of the layer into a preferred direction. The linear polariser can also be prepared e.g. by coating a layer of polymerisable LC material comprising a dye onto a substrate, aligning the LC material into planar orientation, i.e. so that the mesogenic groups are oriented parallel to the plane of the layer, polymerising or crosslinking the material by exposure to heat or actinic radiation. Linear polarisers made from polymerisable material by the above method are described in EP 0 397 263 (Philips), the entire disclosure of which is incorporated into this application by way of reference.

The birefringent marking may also comprise a birefringent LC layer with regions of different thickness sandwiched between two polarisers, and optionally one or more retardation layers located on one or both sides of the LC layer between the LC layer and the polariser.

In another preferred embodiment the LC material of the birefringent marking is a cholesteric LC (CLC) material. Cholesteric LC (CLC) materials with planar orientation show reflection of circular polarised light. Thus, a birefringent marking comprising a CLC material with regions of different thickness prepared according to the inventive method will exhibit a hidden image that is visible when viewed through a circular polariser. CLC materials are preferably used with dark or black substrates, however, reflective substrates can also be used. In case the LC layer comprises a CLC material reflecting selected wavelengths of light, the reflection colour is visible on a dark background without a polariser. In case the CLC layer is a layer reflecting a broad wavelength band, or reflecting the entire visible spectrum, so that no specific reflection colour is seen, the pattern can be made visible by viewing through a circular polariser. Broad waveband CLC films or coatings and their preparation are described e.g. in EP 0 606 940, WO 97/35219, EP 0 982 605 and WO 99/02340.

The LC material of the birefringent layer is preferably a nematic, smectic or cholesteric LC material. Nematic LC materials are especially preferred. In case of a cholesteric LC material, preferably a substrate or surface comprising a light absorbing material, like a dark or black substrate, is used instead of the reflective substrate, and a circular polariser is used instead of a linear polariser.

The liquid crystal material of the birefringent marking is preferably a polymerisable or crosslinkable material that is polymerised or crosslinked during or after evaporation of the solvent.

Alternatively it is possible to apply droplets of a solution or emulsion of a liquid crystal polymer in a suitable solvent. LC side chain polymers or LC main chain polymers can be used. LC side chain polymers are especially preferred. For example, LC side chain polymers comprising a polyacrylate, polymethacrylate, polysiloxane, polystyrene or epoxide backbone with laterally attached mesogenic side chains can be used. The polymer may also comprise side chains with reactive groups that can be crosslinked after or during evaporation of the solvent. If polymers with a glass temperature that is higher than ambient temperature are used, evaporation of the solvent leaves a solid LC polymer film. The LC polymer may also be subjected to mechanical or heat treatment after application to the substrate, thereby differences in thickness between the different regions and fomation of the image can be controlled. In case LC polymers with high melting points are used, like e.g. LC main chain polymers, it is also possible to apply droplets of a melt of the LC polymer onto the substrate which solidify upon cooling.

In case a polymerisable LC material is used, it preferably comprises at least one polymerisable mesogenic compound having one polymerisable functional group and at least one polymerisable mesogenic compound having two or more polymerisable functional groups.

In another preferred embodiment the polymerisable LC material comprises polymerisable mesogenic compounds having two or more polymerisable functional groups (di- or multireactive or di- or multifunctional compounds). Upon polymerisation of such a mixture a three-dimensional polymer network is formed, which is self-supporting and shows a high mechanical and thermal stability and a low temperature dependence of its physical and optical properties. By varying the concentration of the multifunctional mesogenic or non mesogenic compounds the crosslink density of the polymer film and thereby its physical and chemical properties such as the glass transition temperature, which is also important for the temperature dependence of the optical properties of the polymerised film, the thermal and mechanical stability or the solvent resistance can be tuned easily.

The polymerisable mesogenic mono-, di- or multireactive compounds can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive polymerisable mesogenic compounds are shown in the following list of compounds, which should, however, be taken only as illustrative and is in no way intended to restrict, but instead to explain the present invention:

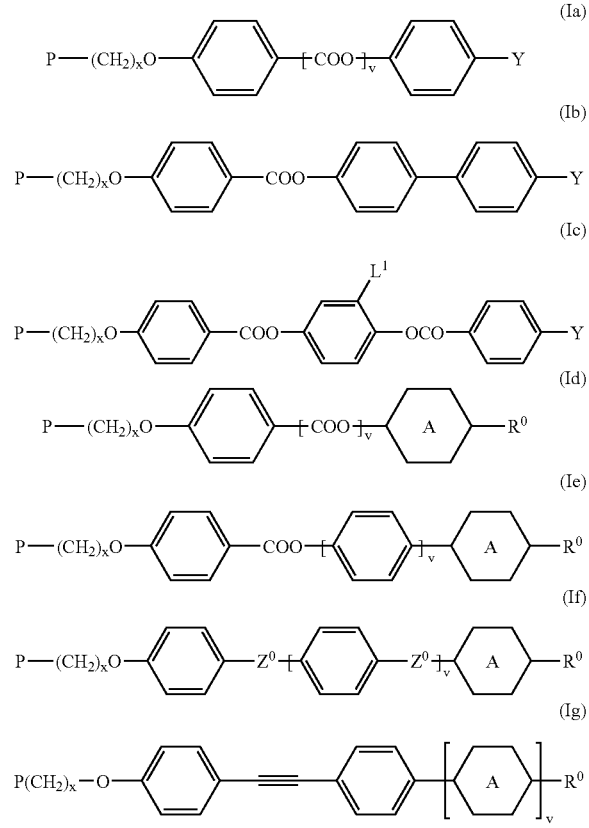

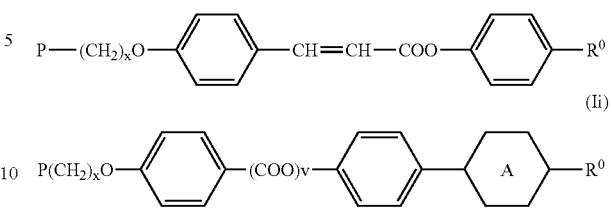

Examples of useful direactive polymerisable mesogenic compounds are shown in the following list of compounds, which should, however, be taken only as illustrative and is in no way intended to restrict, but instead to explain the present invention

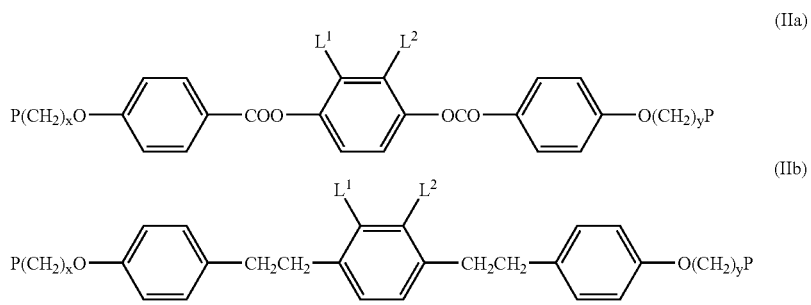

In the above formulae, P is a polymerisable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —CH$_2$CH$_2$— or a single bond, Y is a polar group, $R^0$ is an unpolar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'unpolar group' means an alkyl group with 1 or more, preferably 1 to 12 C atoms or an alkoxy group with 2 or more, preferably 2 to 12 C atoms.

Polymerisation of the polymerisable LC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens vinyl and epoxide groups, preferably a cationic photoinitiator is used. It is also possible to use a polymerisation Initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The curing time is dependant, inter alia, on the reactivity of the polymerisable mesogenic material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The inventive polymerisable liquid crystalline mixtures can additionally comprise one or more other suitable components such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In particular the addition of stabilizers is preferred in order to prevent undesired spontaneous polymerisation of the polymerisable material for example during storage. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerisable LC material in order to modify the physical properties of the resulting polymer film. When adding a chain transfer agent, such as monofunctional thiol compounds like e.g. dodecane thiol or multifunctional thiol compounds like e.g. trimethylpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropanetrimethacrylate or pentaerythritoltetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

It is also possible to add, for example, a quantity of up to 20% by weight of a non polymerisable liquid-crystalline compound to adapt the optical properties of the resulting polymer film.

The polymerisation is preferably carried out in the liquid crystal phase of the polymerisable LC material. Therefore, preferably polymerisable mesogenic compounds or mixtures with low melting points and broad liquid crystal phase ranges are used. The use of such materials allows to reduce the polymerisation temperature, which makes the polymerisation process easier and is a considerable advantage especially for mass production. The selection of suitable polymerisation temperatures depends mainly on the clearing point of the polymerisable material and inter alia on the softening point of the substrate. Preferably the polymerisation temperature is at least 30 degrees below the clearing temperature of the polymerisable mesogenic mixture. Polymerisation temperatures below 120° C. are preferred. Especially preferred are temperatures below 90° C., in particular temperatures of 60° C. or less.

For the substrate or surface onto which the birefringent marking is applied, any type of material can be used, like for example glass or quarz substrates, plastic films or sheets or metal surfaces.

The birefringent markings according to the present invention are especially suitable for use in hot stamping foils and holographic foils for the preparation of security markings and security threads. The preparation of holographic layers is described e.g. in U.S. Pat. No. 4,588,664, the entire disclosure of which is incorporated into this application by way of reference. Hot stamping foils comprising liquid crystal material are described in the patent application GB 2 357 061.

Furthermore, for decorative applications the birefringent marking according to the invention can be directly applied to decorating objects, car bodies or any object with a reflective surface by the method described above. Thus, metal objects like e.g. car bodies, household objects, lamps or other objects can be coated or printed directly with droplets of an LC mixture according to the inventive method.

The inventive birefringent marking can be used for direct application, or as holograms or hot stamping foils for decorative or security applications, to authenticate and prevent counterfeiting of documents of value, for identification of hidden images, informations or patterns. They can be applied to consumer products or household objects, car bodies, foils, packing materials, clothes or woven fabric, incorporated into plastic, or applied as security markings or threads on documents of value like banknotes, credit cards or ID cards, national ID documents, licenses or any propduct with money value, like stamps, tickets, shares, cheques etc.

Without further elaboration, it is believed that one skilled in the art can, using the preceding description, utilize the present invention to ist fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

EXAMPLE 1

The following polymerisable mixture is prepared

| | |
|---|---|
| Compound (A) | 3.02% |
| compound (B) | 7.60% |
| compound (C) | 5.70% |
| compound (D) | 7.04% |
| Irgacure 907 | 1.60% |
| Fluorad FC 171 | 0.15% |
| Toluene | 55.93% |
| Propan-2-ol | 18.97% |

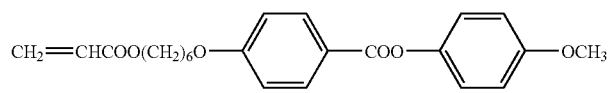

(A)

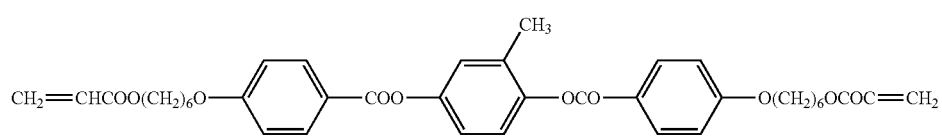

(B)

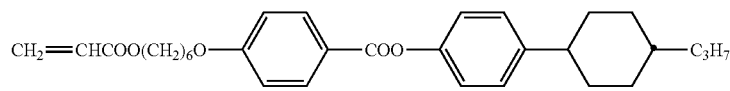

(C)

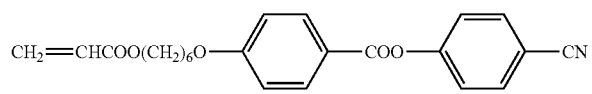

(D)

Compounds (A), (B) and (D) can be prepared according to or in analogy to the methods described in D. J. Broer et al., Makromol. Chem. 190, 3201–3215 (1989). Compound (C) and its preparation are described in GB 2,280,445. Irgacure 907 is a commercially available photoinitiator (Ciba Geigy). Fluorad FC 171 is a commercially available surfactant (DuPont).

Droplets of the mixture were placed onto the metallised side of a metallised PET film. The droplets were left to stand for 2 minutes to allow the solvent to evaporate, leaving behind a liquid crystalline coating. The coating is then cured in an air environment at room temperature to cure the liquid crystal mixture. This forms a polymer film which has variable film thickness.

When viewed through a linear polariser, a distinct 4-spoked pattern of colour is seen. This pattern rotates upon rotation of the polariser.

In addition a pool of liquid crystalline mixture was left to evaporate. When all solvent had been removed a rubber stamp was pressed into the mixture and then stamped onto a similar piece of metallised PET as used before. The film was then exposed to UV radiation to cure the stamped film. When viewed through a linear polariser coloured regions could be seen in the stamped area. The thickness of the stamped film was approximately 2 μm. Thinner areas showed no colour.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A birefringent marking comprising at least one layer of liquid crystal material having a unique, non-uniform pattern of regions of different thickness.

2. A birefringent marking according to claim 1, wherein the liquid crystal material is a vitrified, polymerised or crosslinked liquid crystal material.

3. A birefringent marking according to claim 1, wherein the liquid crystal material is a nematic or smectic liquid crystal material.

4. A birefringent marking according to claim 1, wherein the liquid crystal material is a cholesteric liquid crystal material.

5. A birefrin gent marking according to claim 1, further comprising a reflective layer.

6. A birefringent marking according to claim 5, wherein the reflective layer is a metallic or metallized layer, hot stamping foil, holographic image, pearlescent or interference layer or pearlescent or interference pigment.

7. A birefringent marking according to claim 4, further comprising an absorptive layer.

8. A birefringent marking according to claim 1, further comprising at least one optical retardation layer.

9. A method of preparing a birefringent marking according to claim 1 comprising applying droplets of a solution of a liquid crystal material to a substrate and allowing the solvent to evaporate.

10. A method according to claim 9, wherein the liquid crystal material is a polymerisable or crosslinkable material that is polymerised or crosslinked during or after evaporation of the solvent.

11. A method of applying a hidden image to a surface or substrate, said image being invisible when viewed under unpolarised light and visible when viewed under polarised light, comprising providing a birefringent marking comprising a liquid crystal material having regions of different thickness to the surface.

12. A decorative or security application comprising a birefringent marking according to claim 1.

13. A security, authentification or identification marking or device comprising a birefringent marking according to claim 1.

14. A document of value comprising a marking or device according to claim 13.

15. A birefringent marking according to claim 2, wherein the liquid crystal material is obtained by polymerising or crosslinking a liquid crystal material comprising one or more compounds of formulae Ia–II and/or IIa–IIb

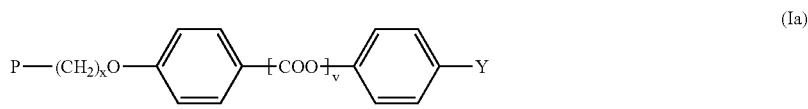
(Ia)

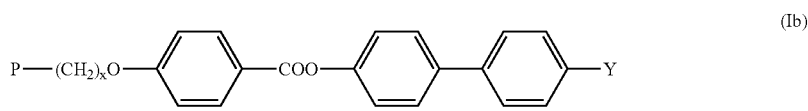
(Ib)

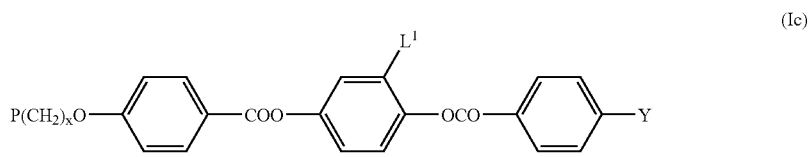
(Ic)

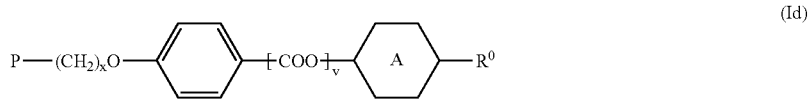
(Id)

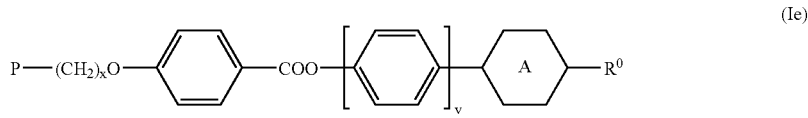
(Ie)

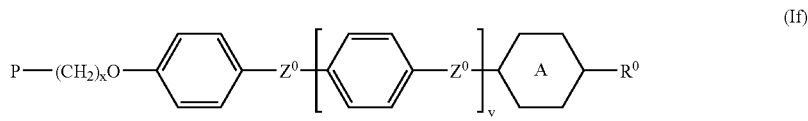
(If)

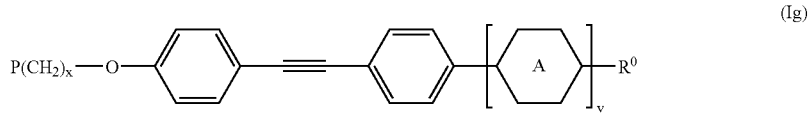
(Ig)

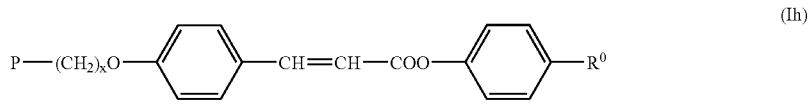
(Ih)

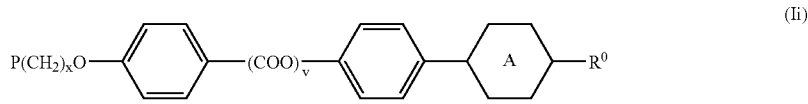
(Ii)

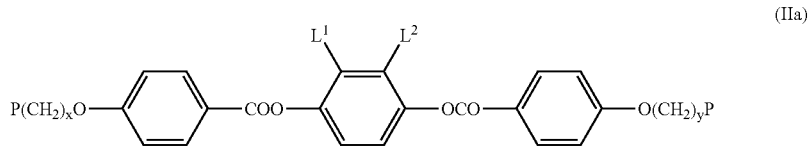
(IIa)

-continued

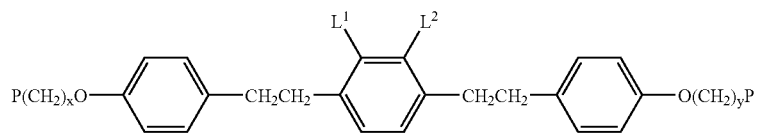
(IIb)

wherein
P is a polymerisable group,
x and y are each independently 1 to 12,
A is 1,4-phenylene that is optionally mono- di or trisubstituted by $L^1$ or 1,4-cyclohexylene,
v is 0 or 1,
$Z^0$ is —COO—, —OCO—, —CH$_2$CH$_2$— or a single bond,
Y is a polar group,
$R^0$ is an unpolar alkyl or alkoxy group, and
$L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

16. A hidden image being invisible when viewed under unpolarised light and visible when viewed under polarised light, comprising a birefringent marking according to claim 1.

* * * * *

UNITED STATES PATENT AND TRADEMARK OFFICE
CERTIFICATE OF CORRECTION

| | | |
|---|---|---|
| PATENT NO. | : 7,033,653 B2 | |
| APPLICATION NO. | : 10/475715 | |
| DATED | : April 25, 2006 | |
| INVENTOR(S) | : Matthias Kuntz et al. | |

It is certified that error appears in the above-identified patent and that said Letters Patent is hereby corrected as shown below:

On the front page Item (75), Inventors: line 4, reads "Dorset (GB); John Patrick, Dorset" should read -- Poole (GB); John Patrick, Wareham --
On the front page, Inventors: line 5, reads "Dorst (GB)" should read -- Wimborne (GB) --
Column 12, line 53, reads "birefrin gent" should read -- birefringent --

Signed and Sealed this

Twenty-seventh Day of February, 2007

JON W. DUDAS
*Director of the United States Patent and Trademark Office*